1 
US011359136B2

(12) United States Patent
Kandapallil et al.

(10) Patent No.: US 11,359,136 B2
(45) Date of Patent: Jun. 14, 2022

(54) COLORIMETRIC INDICATORS FOR PHOTOCURABLE SEALANTS

(71) Applicant: The Boeing Company, Chicago, IL (US)

(72) Inventors: Binil I. Kandapallil, Summerville, SC (US); Andrew M. Zweig, Ellisville, MO (US); Katherine L. Frank, Charleston, SC (US); Mary M. Blevins, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 15/095,405

(22) Filed: Apr. 11, 2016

(65) Prior Publication Data

US 2017/0292068 A1 Oct. 12, 2017

(51) Int. Cl.
| | | |
|---|---|---|
| *C09K 9/02* | (2006.01) | |
| *C08K 5/3417* | (2006.01) | |
| *C08K 5/23* | (2006.01) | |
| *C08K 5/3437* | (2006.01) | |
| *C08K 5/3465* | (2006.01) | |
| *C08K 5/01* | (2006.01) | |
| *C08K 5/357* | (2006.01) | |
| *C08K 5/3445* | (2006.01) | |
| *C08K 3/013* | (2018.01) | |

(52) U.S. Cl.
CPC ............. *C09K 9/02* (2013.01); *C08K 3/013* (2018.01); *C08K 5/01* (2013.01); *C08K 5/23* (2013.01); *C08K 5/3417* (2013.01); *C08K 5/3437* (2013.01); *C08K 5/3445* (2013.01); *C08K 5/3465* (2013.01); *C08K 5/357* (2013.01); *C09K 2211/1007* (2013.01); *C09K 2211/1014* (2013.01); *C09K 2211/1029* (2013.01); *C09K 2211/1033* (2013.01); *C09K 2211/1044* (2013.01)

(58) Field of Classification Search
CPC ............. C09K 9/02; C09K 221/1007; C09K 2211/1014; C09K 2211/1029; C09K 2211/1033; C09K 2211/1044; C08K 3/013; C08K 5/01; C08K 5/23; C08K 5/3417; C08K 5/3437; C08K 5/3445; C08K 5/3465; C08K 5/357
USPC ......... 252/586, 500; 524/108; 106/21, 287.25
See application file for complete search history.

(56) References Cited

U.S. PATENT DOCUMENTS

| | | | | |
|---|---|---|---|---|
| 5,162,407 A | * | 11/1992 | Turner | ............... C04B 41/4966 428/319.3 |
| 5,383,959 A | * | 1/1995 | Sirdesai | ............... C09D 11/50 106/31.16 |
| 6,797,104 B1 | * | 9/2004 | Dyer | ............... B32B 17/06 156/228 |
| 7,892,459 B2 | * | 2/2011 | Schlunt | ............... G02B 5/23 106/287.24 |
| 2002/0136899 A1 | * | 9/2002 | deRojas | ............... C08G 18/12 428/412 |
| 2013/0240804 A1 | * | 9/2013 | Pagba | ............... G02B 1/04 252/586 |
| 2013/0305947 A1 | * | 11/2013 | Iftime | ............... C09D 11/101 101/483 |
| 2015/0086726 A1 | * | 3/2015 | Keledjian | ............... C08L 81/02 427/515 |

FOREIGN PATENT DOCUMENTS

| | | | |
|---|---|---|---|
| WO | WO2008/111995 | * | 9/2008 |
| WO | WO 2008/111995 | | 9/2008 |
| WO | WO2008111995 | * | 9/2008 |

OTHER PUBLICATIONS

Merck Index 11th Edition Whitehouse Station NJ; Merck and Co., Inc. 1989, p. 109.

* cited by examiner

*Primary Examiner* — Ling Siu Choi
*Assistant Examiner* — Ronald Grinsted
(74) *Attorney, Agent, or Firm* — McDonnell Boehnen Hulbert & Berghoff LLP

(57) ABSTRACT

Sealant compositions and methods for their use where the sealant compositions include a curable sealant and a photochromic material that undergoes a feature change upon exposure to radiation.

22 Claims, 1 Drawing Sheet
(1 of 1 Drawing Sheet(s) Filed in Color)

COLORIMETRIC INDICATORS FOR PHOTOCURABLE SEALANTS

BACKGROUND

(1) Field

This invention concerns sealant compositions and methods for their use where the sealant compositions include a curable sealant and a photochromic material that is activated by a radiation source.

(2) Background

Photocurable sealants are widely used. Photocurable sealants are cured to create a seal by exposing the sealant to an energy source such as a UV light source. The degree of cure is impacted by the time that the sealant is exposed to the energy source as well as the intensity of the energy source.

A problem with photocurable sealants is determining whether the sealant is fully cured. If a sealant is not fully cured or includes areas of incomplete cure, then the seal could be prone to failure. One solution to this problem has been to use sealant materials whose natural degradation pathways are accompanied by a molecular color change. More specifically, when these molecules are exposed to an energy source such as UV light or heat, the molecule degrades and changes from, for example blue to white. Sometimes this change of color can be difficult to observe due to the low contrast between the two colors. Because many factors can influence the cure cycle timeframe, the color change of these molecules does not necessarily correlate to the extent of cure of sealant materials. Therefore, there remains a need for a sealant composition that exhibit a detectable change that correlates more directly to the degree of sealant cure.

SUMMARY

One aspect of this invention is a sealant composition including a curable sealant and a photochromic material where the photochromic material undergoes a feature change upon exposure to radiation.

Still a further aspect of this invention is a method for curing a sealant material including preparing an admixture of a curable sealant and a photochromic material wherein the admixture has a first impermanent detectable feature state; and exposing the admixture to radiation for a period of time sufficient to cause the curable sealant to at least partially cure and exhibit a second detectable feature state.

Yet a further aspect of this invention is an article having at least one surface including an at least partially cured sealant composition that is an admixture of a curable sealant and a photochromic material, the admixture having a first impermanent color, wherein the at least partially cured sealant composition has a second permanent color that is different from the first impermanent color and wherein the first impermanent color and the second permanent color are different colors.

DESCRIPTION OF THE FIGURES

The patent or patent application file contains at least one drawing executed in color. Copies of this patent or patent application publication with color drawings will be provided by the Office upon request and payment of the necessary fee.

DETAILED DESCRIPTION

Figure 1:
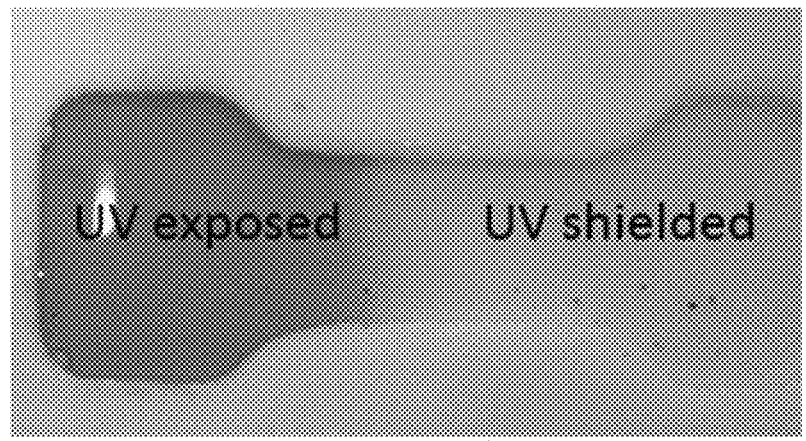
FIG. 1 is a view of a sealant composition article including an orange-red UV light cured portion and an uncured colorless portion prepared according to Example 1.

The present invention relates to sealant compositions and methods for their use where the sealant compositions include at least one curable sealant and at least one photochromic material.

Many curable sealant formulations cure by exposing the sealant formulation to light or heat energy. The extent of cure at any given location generally depends on the cumulative energy (wavelength, time and intensity of the heat or light source used for illumination) applied to the sealant at that location. Thus determining the dose of energy applied to a sealant formulation is useful in evaluating the completeness of cure in a production environment. However, the degree of cure can be uneven, for example where the light or heat energy path to the sealant formulation varies or where the sealant formulation thickness varies. So merely monitoring the total energy applied to the bulk sealant formulation may not provide the best indication of the degree of sealant cure.

We have discovered radiation sensitive materials that exhibit an identifiable feature change, such as an irreversible color change, that can be added into a pre-polymer formulation to provide an indication of the degree of cure of the sealant formulation as well as to quantify the amount of radiation that the pre-polymer has been exposed to.

Several terms that are used consistently in describing the compositions and methods of this invention are defined as follows:

A "photochromic material" is a material that is activated by absorbing radiation energy (visible and non-visible light) having a particular wavelength, most commonly UV light, which causes a feature change and preferably a color change. It should be noted that the word "photochromic" is used here to broadly refer to a material that undergoes a "feature change" upon exposure to light energy.

A "feature change" is an identifiable change in a feature of the photochromic material which change(s) can be detected mechanically or by a human sense such as by the eye with or without enhancement. Non-limiting examples of feature changes include a change of color or color intensity and a change in structure or other interactions with energy apart from just those in the visible portion of the spectrum, e.g., UV, IR, Near IR or Far IR absorbance or reflectance.

"Color" refers to both the presence of color of any type as well as to the absence of color—e.g. clear or transparent and is understood to span wavelengths of from about 400 nm to about 800 nm.

The term "radiation" refers to light energy of any wavelength including but not limited to ultraviolet light energy, infrared light energy and visible light energy.

The term "curable ingredient weight basis" refers to an amount of a sealant composition ingredient present in the composition based upon the total weight of curable ingredients that participate in the curing reaction and become part of the cross-linked cured sealant structure. For purposes of this invention, the photochromic material is included within the definition of "curable ingredients" even if the one or more photochromic materials do not participate in the curing reaction.

The term "total cured sealant weight basis" refers to the amount of a sealant composition ingredient present in the composition based upon the total amount of all ingredients in the subsequently cured solvent-free sealant.

The sealant compositions of this invention include two primary ingredients; (1) at least one curable sealant; and (2) at least one photochromic material. The at least one curable sealant may be selected from one or more known sealant materials that cure by crosslinking or polymerization. The at least one curable sealant may be one or more of any curable prepolymer, monomer and combinations thereof that polymerize or cross-link by various mechanisms and include thermally curable materials and materials that cure by absorbing energy such as UV light.

Some non-limiting examples of thermosetting materials include epoxy resins, polyimides, cyanate esters, polyester resins, polyurethanes, and silicone-based materials. Similar materials can be cured by exposure to light and in particular UV light. Some non-limiting examples of useful light curable materials include epoxies such as acrylated epoxy (e.g, epoxy acrylate, epoxy novolac acrylate), acrylic adhesives, silicone based adhesives, cyanoacrylates and urethane acrylate polymers.

In one aspect, the sealants compositions are used in aircraft and aerospace sealing applications. Aerospace sealants require fuel resistance and flexibility. Certain silicone based curable sealants have been identified that have the proper balance of these properties. Polyethers such as polythioethers that lack an internal disulfide and that cure by reaction with an epoxy resin, and polysulfides are also useful curable sealants in aerospace applications. Such sealant compositions are useful for filling large areas that require long term durability and low temperature flexibility.

One class of useful prepolymers are polythioethers. The first structure below is a difunctional polythioether with thiol end groups. This type of polythioether can be cured via reacting with a tri-functional epoxy.

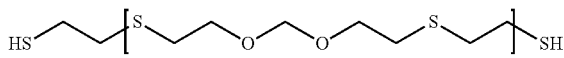

Another class of useful prepolymers are polysulfides. A polysulfide contains disulfides. An idealized difunctional polysulfide analog is shown below. The difunctional polysulfide cures via an oxidative reaction where the end groups react with an oxidant, e.g. $MnO_2$, various peroxides, chromates, etc. to form more disulfides and $Mn(OH)_2$, for example. A branching point added in the middle of the molecule is common in such polysulfide prepolymers.

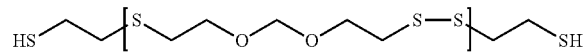

Another class of useful prepolymers are silicones or siloxanes. Silicones and siloxanes cure via condensation reactions, an example of which is shown below, where methanol is the by-product.

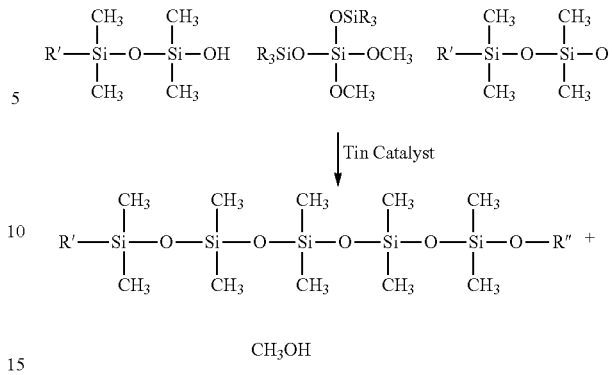

Other sealants with silicone backbones cure via vinyl-hydride addition as shown below.

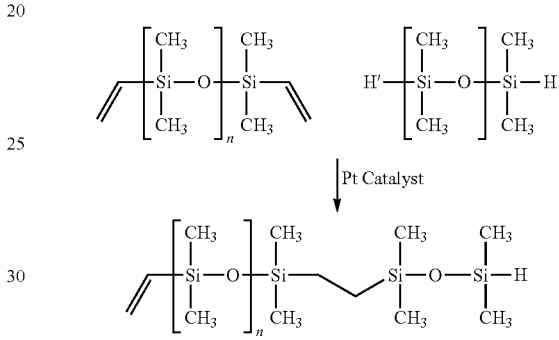

The one or more curable sealants will typically have a molecular weight ranging from about 400 up to 7000 or 8000 g/mol. Alternatively, each of the one or more curable sealants will have a lower molecular weight of at least 1000 g/mol. The functionality of any repeating group may vary from 1 to 3 or more with a functionality ranging from 2 to 3 in the case of polysulfides.

The curable sealant(s) can be monomer, dimer, trimer or prepolymer materials having a range of molecular weights. Choosing at least one curable sealant prepolymer that is made up of like compounds having a range of molecular weights improves cured sealant physical properties such as viscosity, can lower the vapor pressure of the sealant composition before cure and can produce a sealant material with higher tensile strength and hardness after cure.

The sealant compositions of this invention also include at least one photochromic material. As noted above, the photochromic material is a material that is activated by absorbing radiation energy (visible and non-visible light) having a particular wavelength, most commonly UV light, to undergo a feature change such as a color change. The feature change can be a change of feature of the photochromic material alone or it can be a change of feature of the sealant composition. Examples of photochromic materials include spiropyrans, spiropyrimidines, spirooxazines, diarylethenes, photochromic quinones, azobenzenes, other photochromic dyes and combinations thereof. These photochromic materials undergo a reversible color change when exposed to radiation where the first and second colored states are different colors or different intensities of the same color.

One class of useful photochromic materials are spiropyrans. Spiropyrans are photochromic molecules that change color and/or fluoresce under different wavelength light sources. Spiropyrans typically have a 2H-pyran isomer in which the hydrogen atom at position two is replaced by a second ring system linked to the carbon atom at position two of the pyran molecule in a spiro way resulting in a carbon atom that is common on both rings. The second ring is often but not exclusively heterocyclic.

Examples of useful spiropyrans include, but are not limited to 1',3'-Dihydro-8-methoxy-1',3',3'-trimethyl-6-nitrospiro[2H-1-benzopyran-2,2'-(2H)-indole]; 1',3'-Dihydro-1',3',3'-trimethyl-6-nitrospiro[2H-1-benzopyran-2,2'-(2H)-indole]; 1,3-Dihydro-1,3,3-trimethylspiro[2H-indole-2,3'-[3H]naphth[2,1-b][1,4]oxazine]; 6,8-Dibromo-1',3'-dihydro-1',3',3'-trimethylspiro[2H-1-benzopyran-2,2'-(2H)-indole]; 5-Chloro-1,3-dihydro-1,3,3-trimethylspiro[2H-indole-2,3'-[3H]phenanthr[9,10-b][1,4]oxazine]; 6-Bromo-1',3'-dihydro-1',3',3'-trimethyl-8-nitrospiro[2H-1-benzopyran-2,2'-(2H)-indole]; 5-Chloro-1,3-dihydro-1,3,3-trimethylspiro[2H-indole-2,3'-[3H]naphth[2,1-b][1,4]oxazine]; 1',3'-Dihydro-5'-methoxy-1',3,3-trimethyl-6-nitrospiro[2H-1-benzopyran-2,2'(2H)-indole]; 1,3-Dihydro-1,3,3-trimethylspiro[2H-indole-2,3'-[3H]phenanthr[9,10-b][1,4]oxazine]; 5-Methoxy-1,3,3-trimethylspiro[indoline-2,3'-[3H]naphtha[2,1-b]pyran]; 8'-methacryloxymethyl-3-methyl-6'-nitro-1-selenaspiro-[2H-1'-benzopyran-2,2'-benzoselenenazoline]; 3-isopropyl-8'-methacryloxymethyl-5-methoxy-6'-nitro-1-selenaspiro[2H-1'-benzopyran-2,2'-benzoselenazoline]; 3-isopropyl-8'-methacryloxymethyl-5-methoxy-6'-nitro-1-selenaspiro[2H-1'-benzopyran-2,2'-benzoselenazoline]; 8'-methacryloxymethyl-5-methoxy-2-methyl-6'-nitro-1-selenaspiro[2H-1'-benzopyran-2,2'-benzoselenazoline]; 2,5-dimethyl-8'-methacryloxymethyl-6'-nitro-1-selenaspiro[2H-1'-benzopyran-2,2'-benzoselenazoline]; 8'-methacryloxymethyl-5-methoxy-3-methyl-6'-nitrospiro[benzoselenazoline-2,2'(2'H)-1'-benzothiopyran]; 8-methacryloxymethyl-6-nitro-1',3',3'-trimethylspiro[2H-1-benzothiopyran-2,2'-indoline]; 3,3-dimethyl-1-isopropyl-8'-methacryloxymethyl-6'-nitrospiro-[indoline-2,2'(2'H)-1'-benzothiopyran]; 3,3-dimethyl-8'-methacryloxymethyl-6'-nitro-1-octadecylspiro [indoline-2,2'(2'H)-1'-benzothiopyran] and combinations thereof.

Another class of useful photochromic materials are azobenzene and derivatives of azobenzene which are referred to collectively as "azobenzenes". Azobenzene has the following formula:

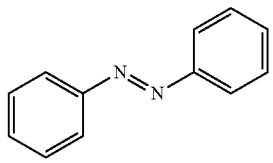 [SMILES: c1ccc(/N=N/c2ccccc2)cc1]

Azobenzenes are capable of photoisomerization between trans- and cis-isomers. Examples of useful azobenzenes include: azobenzene; 4-[Bis(9,9-dimethylfluoren-2-yl)amino]azobenzene; 4-(N,N-Dimethylamino)azobenzene-4'-isothiocyanate; 2,2'-Dihydroxyazobenzene; 1,1'-Dibenzyl-4,4'-bipyridinium dichloride; 1,1'-Diheptyl-4,4'-bipyridinium dibromide; 2,2',4'-Trihydroxy-5-chloroazobenzene-3-sulfonic acid and combinations thereof.

Still another class of useful photochromic materials are spirooxazines. Examples of useful spirooxazines include: 1,3-Dihydro-1,3,3-trimethylspiro[2H-indole-2,3'-[3H]phenanthr[9,10-b](1,4)oxazine]; 1,3,3-trimethyl spiro(indoline-2,3'-(3H)naphth(2,1-b)(1,4)oxazine); 3-ethyl-9'-methoxy-1,3-dimethylspiro(indoline-2,3'-(3H)naphth(2,1-b)(1,4)oxazine); 1,3,3-trimethylspiro(indoline-2,3'-(3H)pyrido(3,2-f)-(1,4)benzoxazine); 1,3-dihydrospiro(indoline-2,3'-(3H)pyrido(3,2-f)-(1,4)benzoxazine) and combinations thereof.

Another class of useful photochromic materials are spiropyrimidines. Some examples of useful spiropyrimidines include: 2,3-Dihydro-2-spiro-4'-[8'-aminonaphthalen-1'(4'H)-one]pyrimidine; 2,3-Dihydro-2-spiro-7'-[8'-imino-7',8'-dihydronaphthalen-1'-amine]pyrimidine and combinations thereof.

A further useful class of photochromic materials are diarylethenes. Examples of useful diarylethenes include: 2,3-Bis(2,4,5-trimethyl-3-thienyl)maleic anhydride; 2,3-Bis (2,4,5-trimethyl-3-thienyl)maleimide; cis-1,2-Dicyano-1,2-bis(2,4,5-trimethyl-3-thienyl)ethane; 1,2-Bis[2-methylbenzo[b]thiophen-3-yl]-3,3,4,4,5,5-hexafluoro-1-cyclopentene; 1,2-Bis(2,4-dimethyl-5-phenyl-3-thienyl)-3,3,4,4,5,5-hexafluoro-1-cyclopentene; stilbene; dithienylethenes and combinations thereof.

Yet another useful class of photochromic materials are photochromic quinones. Examples of useful photochromic quinones include: 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene and combinations thereof.

It should be noted that the photochromic compounds disclosed above are provided for exemplary purposes only and are not intended to limit the scope of the present invention.

In one aspect, the photochromic material is light activated and preferably visible light activated or UV light activated to produce a reversible color feature change. In most cases, the color feature change is caused by a reversible transformation of the photochromic material between two molecular forms having different absorption spectra as a result of the absorption of electromagnetic radiation. When the source of radiation is withdrawn or turned off, the photochromic material normally reverts back to its first color state.

In another aspect, the change of state of the photochromic material is made irreversible by interacting with the curable sealant. In this aspect, exposing the photochromic material to a radiation source causes the photochromic material to change from a first state to a second state. But when the radiation source is removed, the photochromic material is prevented from reverting back to its first state via a physical or chemical interaction with the one or more curable sealant and/or with an optional curable sealant ingredient.

The photochromic material is present in the sealant composition admixture in an amount ranging from greater than 0 wt % up to about 20 wt % on a curable ingredient weight basis. In this aspect, the curable sealant is present in the sealant composition in an amount ranging from about 80 wt % to less than 100 wt % on a curable ingredient weight basis. In a narrower aspect of this invention, the photochromic material is present in the sealant composition admixture in an amount ranging from 0.001 wt % up to about 5.0 wt % on a curable ingredient weight basis and the curable sealant is present in the sealant composition admixture in an amount ranging from about 95.0 wt % to 99.999 wt % on a curable ingredient weight basis. In this aspect, the photochromic material is preferably one or more spiropyrans.

The sealant compositions may include one or more optional ingredients. The optional ingredients can be "curable ingredients" as that term is defined herein or they may be ingredients that are inert to the curing reaction and are not "curable ingredients". A non-limiting list of optional ingredients include fillers, catalysts, solvents and other viscosity modifying agents, stabilizers, adhesion promoters, anticorrosion additives, antimicrobials and density modifying materials.

Fillers are a first optional sealant composition ingredient. One or more fillers can be added to a sealant composition for a variety of reasons including to enhance physical properties, to modify composition viscosity and to reduce the composition cost. Examples of optional fillers include silicas such as hydrophobic fumed silica and hydrophilic fumed silica, alumina, Kaolin clay, talc, calcium carbonate (either surface modified or not), carbon black, carbon nanotubes, metallic particles or fibers, hollow spheres, e.g., inorganic or organic/polymeric particles such as hollow or porous polymeric nylon or polyurea microspheres, or other, highly porous particles. Optional fillers may be present in the sealant compositions in an amount ranging from greater than about 0 wt % to about 50 wt % or from about 20 wt % to about 40 wt %—both on a total cured sealant weight basis.

Catalysts are another optional sealant composition ingredient. One or more optional catalysts are useful for promoting the curing of the sealant composition. The catalysts may, for example, be thermally activated catalysts such as $MnO_2$, peroxybenzoates such as tert-butyl peroxybenzoate, dimethylpropiophenone and photocatalysts such as of mono-acyl phosphine oxides (e.g., 2,4,6-trimethylbenzoylphenylphosphonic acid, ethyl ester ("TPO-L"), 1-hydroxycylcohexyl phenyl ketone, benzyl dimethyl ketal, 2-hydroxy-2-methyl-1-phenyl-propan-1-one, benzophenone, and combinations thereof.

In one aspect the optional catalyst is one or more monoacyl phosphine oxides which can provide good through-cure, are liquids and easy to handle and which are easy to incorporate into many sealant compositions.

The optional catalyst(s) may be present in the sealant compositions in an amount ranging from about 0.001 wt % to about 4 wt % on a total cured sealant weight basis.

One or more optional solvents can be added to the sealant compositions of this invention. Solvents can be added to the sealing compositions to modify its viscosity to, for example, allow it to be applied uniformly to a surface. Examples of useful solvents include, but are not limited to; ketones such as MEK (2-butanone), MPK (2-pentanone), MIBK (4-methyl-2-pentanone), and cyclohexanone; aromatic such as toluene, xylenes, naphtha and mineral spirits; esters such as ethyl acetate, butyl acetate and half-esters of ethanediol or propanediol isomers or oligomers thereof; mono-methyl or monobutyl ethers of ethanediol or propanediol isomers or oligomers thereof; and other commercially available solvents such any solvents from the Dowanol® family—for example Dowanol PM® or Butyl Cellosolve®.

In another aspect of this invention, ethyl acetate or butyl acetate can be used sealant composition solvents as can slower evaporating aromatics such as xylenes or ethylbenzene. In some cases it is desirable for curable sealant formulations to contain no VOCs. In this case, in order to reduce sealant composition viscosity, reactive diluents, such as low molecular weight di-functional oligomers, can be used in lieu of solvents as viscosity modifiers. Such viscosity modifying materials would be incorporated in the overall free-radical polymerization process. An examples of a reactive viscosity modifying material is 1,6-hexane-diacrylate.

Another optional ingredient is one or more stabilizers which may be used to increase shelf-life of the compositions prior to their use or that extend the lifetime of the cured sealant. Still another type of optional ingredients are adhesion promoters that improve the adhesion of the composition to a specific surface.

The sealant compositions described herein have many uses. The compositions can be applied as a thin layer to provide a cured coating on a surface. Alternatively, they can be used to bond two surfaces together. In another application, they can be used to fill gaps or holes in an article. Indeed, the sealing compositions can be used in any applications that are currently known or that are identified in the future has been capable of being performed using a curable sealant.

One advantage of the sealing compositions of this invention is that the degree of cure can be monitored and controlled. The sealing compositions of this invention are cured by preparing an admixture of at least one curable sealant and at least one photochromic material. The admixture, prior to curing, has a first impermanent detectable feature. The detectable feature is a feature of the admixture that can be detected mechanically or by a human sense such as by the eye with our without enhancement both prior to and during composition curing. Non-limiting examples of feature changes include: a change of color or color intensity; a change in structure; a change in a surface feature—e.g., surface roughness, tackiness, solvent affinity; a change in solvophobicity; and a change in absorbance, reflectance or emission behavior that could be detected by a spectroscopic device such as an infrared spectrometer, a near infrared spectrometer, a Raman spectrometer, a far infrared spectrometer or other similar instruments. Ideally, the detectable feature change will be correlated with the degree of cure of the sealant material.

When the sealing composition is prepared it has a detectable feature in a first state. Next the sealing composition admixture is exposed to light energy (most commonly UV light) for a period of time sufficient to cause a change in structure of the photochromic material such that the sealing composition admixture undergoes a detectable feature change, i.e. the detectable feature changes to a second state that is different from the first state of the detectable feature. In one aspect the light energy also causes the admixture to cure simultaneously with the change of state of the detectable feature. In an alternative aspect, the curable sealant admixture includes a thermosetting curable sealant prepolymer, monomer and combinations thereof and the admixture is exposed to both heat and to light energy to simultaneously cure the admixture and change the feature state of the photochromic material such that the curable sealant admixture exhibits a second detectable feature state.

The second detectable feature of the at least partially cured sealant may be impermanent or it may be a permanent detectable change. By permanent, it is meant that the detectable feature remains essentially in its second detectable state once the sealant has become at least partially cured and/or radiation is removed from the curable sealant admixture.

The change of state of the detectable feature can be used for variety of purposes. The change of state of the detectable feature can be used to identify when sealing composition admixture curing has begun and/or when it has ended. In certain aspects of this invention the change in state of the detectable feature during the curing of the curable sealant admixture provides an indication of the degree of cure of the sealant. For example, the second state of the detectable feature can be a permanent color that has an intensity that can be correlated to one or more of the length of time the admixture is exposed to light energy and/or the light energy intensity. In this aspect, the change of state of the detectable feature is used to control the sealant cure by exposing the sealant composition admixture to light energy—and heat if a thermosetting sealant material is used—for a period of time sufficient for the at least partially cured sealant to reach a known intensity of the detectable feature second color state. Once the desired intensity is reached, the radiation directed to the sealant composition is stopped.

The change of state of the detectable feature allows the curing process to be automated. In the case of a detectable color change, a colorimeter can be used to monitor the color of the curing sealant composition admixture. When a pre-determined color intensity is reached, i.e., a color intensity that corresponds to a degree of cure of the curable sealant, the colorimeter can send a signal that turns off or deactivates the radiation source(s) directed at the sealant composition.

Example 1

Spiropyrans ("SP")

3-Dihydro-1,3,3-trimethylspiro[2H-indole-2,3'-[3H] naphth[2,1-b][1,4]oxazine] in MPK turns blue under UVA lamp, but reverts back immediately to colorless form under room light (~milliseconds). SP (13 mg) was mixed with a composition containing 10 g pre-polymer, composed of 2,2' (Ethylenedioxy)diethanethiol, 2,2'-thiodiethanethiol, tri(ethylene glycol) divinyl ether and 2,2-Dimethoxy-2-phenylacetophenone to form a sealant composition. The sealant composition was formed into a barbell shaped article. Half of the article was kept covered and half was exposed to 400 nm UV light whereupon the half exposed to UV light turned orange-red and did not revert back to colorless form under room light or sunlight. FIG. 1 is a photograph of the article including a UV uncured portion that is colorless and a UV cured portion that is permanently orange-red.

Example 2

Figure 2:
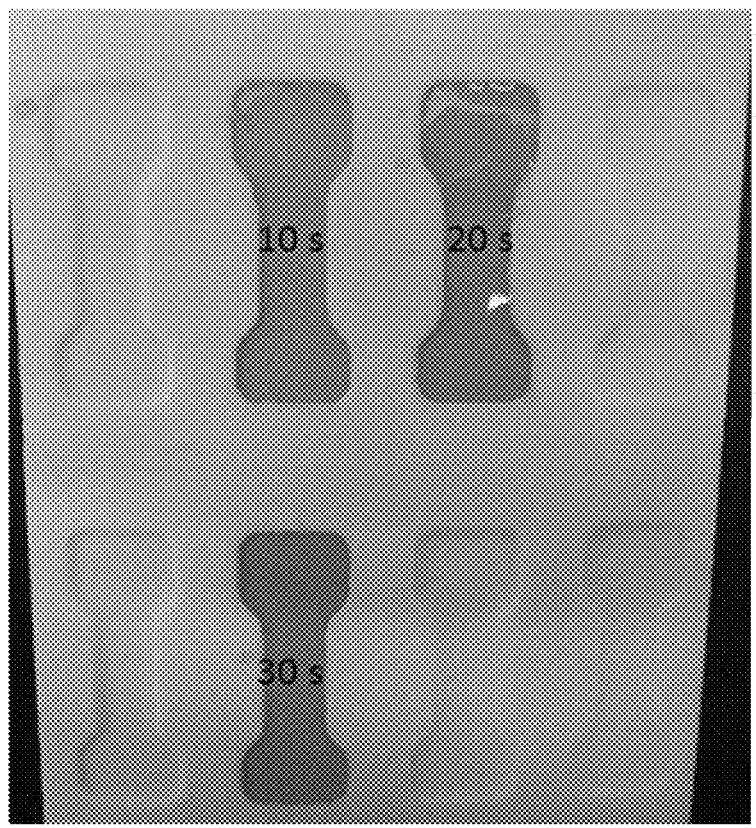
FIG. 2 is an overhead view of three sealant composition articles prepared according to Example 1 where the articles were exposed to UV light for 10, 20 and 30 seconds respectively and where the color intensity of the articles increased as their exposure time to UV light increased.

The sealant composition of Example 1 was used to evaluate whether the intensity of the permanent color corresponds to cumulative radiation exposure. FIG. 2 shows three different articles made using the Example 1 sealant composition where each article was exposed to 400 nm UV light for different lengths of time—10, 20 and 30 seconds. The intensity differences of the color of each article in FIG. 2 is apparent to the human eye and demonstrates that the irreversible color change of the sealant intensified as the amount of UV light that the sealant composition was exposed to increased.

Example 3

Azobenzenes

A curable sealant admixture is prepared by combining 10 g sealant pre-polymer, composed of 2,2' (Ethylenedioxy) diethanethiol, 2,2'-thiodiethanethiol, tri(ethylene glycol) divinyl ether and 2,2-Dimethoxy-2-phenylacetophenone with from about 1 mg to about 500 mg of 4-[Bis(9,9-dimethylfluoren-2-yl)amino]azobenzene. The admixture is exposed to 450 nm light for a period of time sufficient to at least partially cure and cause a change of state (color) of the sealant admixture. Although 4-[Bis(9,9-dimethylfluoren-2-yl)amino]azobenzene was used in this example, any species compound from the azobenzenes described above may be used.

Example 4

Spiropyrimidines

A curable sealant admixture is prepared by combining 10 g sealant pre-polymer, composed of 2,2' (Ethylenedioxy) diethanethiol, 2,2'-thiodiethanethiol, tri(ethylene glycol) divinyl ether and 2,2-Dimethoxy-2-phenylacetophenone with from about 1 mg to about 500 mg 2,3-Dihydro-2-spiro-4'-[8'-aminonaphthalen-1'(4'H)-one]pyrimidine. The admixture is exposed to 400 nm UV light for a period of time sufficient to at least partially cure and cause a change of state (color) of the sealant admixture. Although 2,3-Dihydro-2-spiro-4'-[8'-aminonaphthalen-1'(4'H)-one]pyrimidine was used in this example, any species compound from the spiropyrimidines described above may be used.

Example 5

Spirooxazines

A curable sealant admixture is prepared by combining 10 g sealant pre-polymer, composed of 2,2' (Ethylenedioxy) diethanethiol, 2,2'-thiodiethanethiol, tri(ethylene glycol) divinyl ether and 2,2-Dimethoxy-2-phenylacetophenone with from about 1 mg to about 500 mg of 1,3-Dihydro-1,3,3-trimethylspiro[2H-indole-2,3'-[3H]phenanthro[9,10-b](1,4)oxazine]. The admixture is exposed to 400 nm UV light for a period of time sufficient to at least partially cure and cause a change of state (color) of the sealant admixture. Although 1,3-Dihydro-1,3,3-trimethylspiro[2H-indole-2,3'-[3H]phenanthro[9,10-b](1,4)oxazine] was used in this example, any species compound from the spirooxazines described above may be used.

Example 6

Diarylethenes

A curable sealant admixture is prepared by combining 10 g sealant pre-polymer, composed of 2,2' (Ethylenedioxy) diethanethiol, 2,2'-thiodiethanethiol, tri(ethylene glycol) divinyl ether and 2,2-Dimethoxy-2-phenylacetophenone with from about 1 mg to about 500 mg of 2,3-Bis(2,4,5-trimethyl-3-thienyl)maleic anhydride. The admixture is exposed to 400 nm UV light for a period of time sufficient to at least partially cure and cause a change of state (color) of the sealant admixture. Although 2,3-Bis(2,4,5-trimethyl-3-thienyl)maleic anhydride was used in this example, any species compound from the diarylethenes described above may be used

Example 7

Photochromic Quinones

A curable sealant admixture is prepared by combining 10 g sealant pre-polymer, composed of 2,2' (Ethylenedioxy) diethanethiol, 2,2'-thiodiethanethiol, tri(ethylene glycol) divinyl ether and 2,2-Dimethoxy-2-phenylacetophenone with from about 1 mg to about 500 mg of 1-phenoxy-2,4-dioxyanthraquinone. The admixture is exposed to 400 nm UV light for a period of time sufficient to at least partially cure and cause a change of state (color) of the sealant admixture. Although 1-phenoxy-2,4-dioxyanthraquinone was used in this example, any species compound from the photochromic quinones described above may be used The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A cured sealant composition comprising a mixture of a cured polythioether sealant or polysulfide sealant formed by curing with light a curable pre-polymer formulation;
   from about 20 weight % to about 50 weight % of one or more fillers based on the weight of the sealant composition; and
   a photochromic material capable of undergoing a reversible color change when exposed to light energy or radiation, wherein the color of the photochromic material is permanent in the cured sealant and does not reversibly change in the absence of light or upon exposure to light energy or radiation.

2. The cured sealant composition of claim 1 wherein the photochromic material is present in an amount ranging from greater than 0 wt % up to about 20 wt % on a curable ingredient weight basis and the curable formulation is present in the composition in an amount ranging from about 80 wt % to less than 100 wt % on a curable ingredient weight basis.

3. The cured sealant composition of claim 1 wherein the photochromic material is one or more of spiropyrans, spiropyrimidines, spirooxazine, diarylethenes, azobenzenes, photochromic quinones and combinations thereof.

4. The cured sealant composition of claim 3 wherein the photochromic material is one or more spiropyrans.

5. The cured sealant composition of claim 1 further comprising one or more of catalysts, solvents, viscosity modifying agents, stabilizers, adhesion promoters, anticorrosion additives, antimicrobials and density modifying materials.

6. The cured sealant composition of claim 1, wherein the sealant comprises a cured polysulfide polymer and the photochromic material comprises from about 0.001 to about 5 wt % of one or more spiropyrans based on a curable ingredient weight basis.

7. The cured sealant composition of claim 6 wherein the spiropyran is 1,3,-Dihydro-1,3,3-trimethylspiro[2H-indole-2,3'-[3H]naphth[2,1-b][1,4]oxazine].

8. A cured polythioether sealant or polysulfide sealant composition comprising an ultraviolet light cured sealant, a photochromic material capable of undergoing a reversible color change when exposed to light energy or radiation, and from about 20 weight % to about 50 weight % of one or more fillers based on the weight of the sealant composition, wherein the color of the photochromic material is permanent in the cured sealant and does not reversibly change in the absence of light or upon exposure to light energy or radiation, and wherein the ultraviolet light cured sealant is formed by curing a curable pre-polymer formulation comprising one or more monomer, dimer, trimer or prepolymer polythioethers or polysulfides.

9. The cured sealant composition according to claim 1, wherein the photochromic material is uniformly dispersed within the sealant.

10. The cured sealant composition according to claim 8, wherein the photochromic material is uniformly dispersed within the sealant.

11. The cured sealant composition of claim 1 wherein the curable pre-polymer formulation comprises a prepolymer polythioether.

12. The cured sealant composition of claim 1 wherein the curable pre-polymer formulation comprises a prepolymer polysulfide.

13. The cured sealant composition of claim 1 wherein the filler is silica, alumina, Kaolin clay, talc, calcium carbonate, carbon black, carbon nanotubes, metallic particles or fibers, hollow spheres, or a combination thereof.

14. The cured sealant composition of claim 3 wherein the photochromic material is a spiropyran, spiropyrimidine, spirooxazine, diarylethene, azobenzene, photochromic quinone, or a combination thereof.

15. The cured sealant composition of claim 1 wherein the photochromic material is 1',3'-Dihydro-8-methoxy-1',3',3'-trimethyl-6-nitrospiro[2H-1-benzopyran-2,2'-(2H)-indole]; 1',3'-Dihydro-1',3',3'-trimethyl-6-nitrospiro[2H-1-benzopyran-2,2'-(2H)-indole]; 1,3-Dihydro-1,3,3-trimethylspiro[2H-indole-2,3'-[3H]naphth[2,1-b][1,4]oxazine]; 6,8-Dibromo-1',3'-dihydro-1',3',3'-trimethylspiro[2H-1-benzopyran-2,2'-(2H)-indole]; 5-Chloro-1,3-dihydro-1,3,3-trimethylspiro[2H-indole-2,3'-[3H]phenanthr[9,10-b][1,4]oxazine]; 6-Bromo-1',3'-dihydro-1',3',3'-trimethyl-8-nitrospiro[2H-1-benzopyran-2,2'-(2H)-indole]; 5-Chloro-1,3-dihydro-1,3,3-trimethylspiro[2H-indole-2,3'-[3H]naphth[2,1-b][1,4]oxazine]; 1',3'-Dihydro-5'-methoxy-1',3,3-trimethyl-6-nitrospiro[2H-1-benzopyran-2,2'(2H)-indole]; 1,3-Dihydro-1,3,3-trimethylspiro[2H-indole-2,3'-[3H]phenanthr[9,10-b][1,4]oxazine]; 5-Methoxy-1,3,3-trimethylspiro[indoline-3,3'-[3H]naphtha[2,1-b]pyran]; 8'-methacryloxymethyl-3-methyl-6'-nitro-1-selenaspiro-[2H-1'-benzopyran-2,2'-benzoselenenazoline]; 3-isopropyl-8'-methacryloxymethyl-5-methoxy-6'-nitro-1-selenaspiro[2H-1'-benzopyran-2,2'-benzoselenazoline]; 3-isopropyl-8'-methacryloxymethyl-5-methoxy-6'-nitro-1-selenaspiro[2H-1'-benzopyran-2,2'-benzoselenazoline]; 8'-methacryloxymethyl-5-methoxy-2-methyl-6'-nitro-1-selenaspiro[2H-1-benzopyran-2,2'-benzoselenazoline]; 2,5-dimethyl-8'-methacryloxymethyl-6'-nitro-1-selenaspiro[2H-1'-benzopyran-2,2'-benzoselenazoline]; 8'-methacryloxymethyl-5-methoxy-3-methyl-6'-nitrospiro[benzoselenazoline-2,2'(2'H)-1'-benzothiopyran]; 8-methacryloxymethyl-6-nitro-1',3',3'-trimethylspiro[2H-1-benzothiopyran-2,2'-indoline]; 3,3-dimethyl-1-isopropyl-8'-methacryloxymethyl-6'-nitrospiro[indoline-2,2'(2'H)-1'-benzothiopyran]; 3,3-dimethyl-8'-methacryloxymethyl-6'-nitro-1-octadecylspiro[indoline-2,2'(2'H)-1-benzothiopyran], or a combination thereof.

16. The cured sealant composition of claim 1 wherein the photochromic material is azobenzene; 4-[Bis(9,9-dimethylfluoren-2-yl)amino]azobenzene; 4-(N,N-Dimethylamino)azobenzene-4'-isothiocyanate; 2,2'-Dihydroxyazobenzene; 1,1'-Dibenzyl-4,4'-bipyridinium dichloride; 1,1'-Diheptyl-4,4'-bipyridinium dibromide; 2,2',4'-Trihydroxy-5-chloroazobenzene-3-sulfonic acid, or a combination thereof.

17. The cured sealant composition of claim 1 wherein the photochromic material is 1,3-Dihydro-1,3,3-trimethylspiro[2H-indole-2,3'-[3H]phenanthr[9,10-b](1,4)oxazine]; 1,3,3-trimethyl spiro(indoline-2,3'-(3H)naphth(2,1-b)(1,4)oxazine); 3-ethyl-9'-methoxy-1,3-dimethylspiro(indoline-2,3'-(3H)naphth(2,1-b)(1,4)oxazine); 1,3,3-trimethylspiro(indoline-2,3'-(3H)pyrido(3,2-f)-(1,4)benzoxazine); 1,3-dihydrospiro(indoline-2,3'-(3H)pyrido(3,2-f)-(1,4) benzoxazine), or a combination thereof.

18. The cured sealant composition of claim 1 wherein the photochromic material is 2,3-Dihydro-2-spiro-4'-[8'-aminonaphthalen-1'(4'H)-one]pyrimidine; 2,3-Dihydro-2-spiro-7'-[8'-imino-7',8'-dihydronaphthalen-1'-amine]pyrimidine, or a and combination thereof.

19. The cured sealant composition of claim 1 wherein the photochromic material is 2,3-Bis(2,4,5-trimethyl-3-thienyl) maleic anhydride; 2,3-Bis(2,4,5-trimethyl-3-thienyl)maleimide; cis-1,2-Dicyano-1,2-bis(2,4,5-trimethyl-3-thienyl) ethane;1,2-Bis[2-methylbenzo[b]thiophen-3-yl]-3,3,4,4,5,5-hexafluoro-1-cyclopentene; 1,2-Bis(2,4-dimethyl-5-phenyl-3-thienyl)-3,3,4,4,5,5-hexafluoro-1-cyclopentene; stilbene; dithienylethenes, or a combination thereof.

20. The cured sealant composition of claim 1 wherein the photochromic material is 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene, or a combination thereof.

21. The cured sealant composition of claim 1, wherein no reversible color change occurs upon exposure to ultraviolet light, infrared light or visible light.

22. The cured sealant composition of claim 8, wherein no reversible color change occurs upon exposure to ultraviolet light, infrared light or visible light.

\* \* \* \* \*